US009520083B2

(12) United States Patent
Kim

(10) Patent No.: US 9,520,083 B2
(45) Date of Patent: Dec. 13, 2016

(54) ORGANIC LIGHT EMITTING DISPLAY DEVICE

(71) Applicant: Samsung Display Co., Ltd., Yongin, Gyeonggi-Do (KR)

(72) Inventor: Jin-Woo Kim, Yongin (KR)

(73) Assignee: Samsung Display Co., Ltd. (KR)

( * ) Notice: Subject to any disclaimer, the term of this patent is extended or adjusted under 35 U.S.C. 154(b) by 364 days.

(21) Appl. No.: 14/048,866

(22) Filed: Oct. 8, 2013

(65) Prior Publication Data

US 2014/0362124 A1 Dec. 11, 2014

(30) Foreign Application Priority Data

Jun. 7, 2013 (KR) ........................ 10-2013-0065340

(51) Int. Cl.

| | |
|---|---|
| ***H05B 37/02*** | (2006.01) |
| ***G09G 3/32*** | (2016.01) |
| ***G09G 3/36*** | (2006.01) |
| ***G06F 3/041*** | (2006.01) |
| ***G09G 3/20*** | (2006.01) |
| ***G05F 1/56*** | (2006.01) |
| ***G09G 3/22*** | (2006.01) |
| ***H02M 1/44*** | (2007.01) |

(52) U.S. Cl.

CPC .... *G09G 3/3233* (2013.01); *G09G 2300/0861* (2013.01); *G09G 2330/00* (2013.01); *G09G 2330/028* (2013.01)

(58) Field of Classification Search

CPC ..................... G09G 3/3233; G09G 2300/0866; G09G 3/3291; G09G 3/3275; G09G 3/006; H05B 37/02

USPC .... 250/214 AL; 315/294; 320/108; 323/284; 327/109; 345/101, 173–174, 204, 207, 345/211–214, 690–691, 76–77, 80, 82, 89

See application file for complete search history.

(56) References Cited

U.S. PATENT DOCUMENTS

| | | | | | |
|---|---|---|---|---|---|
| 2003/0122759 | A1* | 7/2003 | Abe | G09G 3/22 | 345/89 |
| 2008/0111812 | A1* | 5/2008 | Shirasaki | G09G 3/3233 | 345/212 |
| 2008/0303967 | A1* | 12/2008 | Huang | G09G 3/3655 | 349/39 |
| 2008/0309608 | A1* | 12/2008 | Shen | G09G 3/3696 | 345/101 |

(Continued)

FOREIGN PATENT DOCUMENTS

| | | | | |
|---|---|---|---|---|
| KR | 20030091374 A | * 12/2003 | | H02M 1/44 |
| KR | 20090091374 | * 12/2003 | | |

(Continued)

*Primary Examiner* — Lin Li

(74) *Attorney, Agent, or Firm* — Innovation Counsel LLP

(57) ABSTRACT

An organic light emitting display includes a display panel, a power supply circuit, a voltage detection unit and a voltage compensation unit. The display panel includes a plurality of pixels. The power supply circuit outputs a first power source to the display panel. The voltage detection unit is positioned between the display panel and the power supply circuit, and detects a detection voltage data of the first power source output from the power supply circuit. The voltage compensation unit compares the detection voltage data with a previously stored reference voltage data, and controls the power supply circuit to output the first power source having a voltage level set based on the reference voltage data.

13 Claims, 7 Drawing Sheets

(56) References Cited

U.S. PATENT DOCUMENTS

| | | | | |
|---|---|---|---|---|
| 2009/0033685 | A1* | 2/2009 | Park | G09G 3/3233 345/690 |
| 2010/0026673 | A1* | 2/2010 | Cheng | G09G 3/3648 345/211 |
| 2011/0051461 | A1* | 3/2011 | Buchwald | H02M 3/33507 363/15 |
| 2011/0157133 | A1* | 6/2011 | Ogura | G09G 3/20 345/211 |
| 2011/0205221 | A1* | 8/2011 | Lin | G09G 3/2092 345/213 |
| 2011/0205250 | A1* | 8/2011 | Yoo | G09G 3/3233 345/690 |
| 2012/0096078 | A1* | 4/2012 | Coates et al. | 709/203 |
| 2012/0105408 | A1* | 5/2012 | Kang | G09G 3/3225 345/211 |
| 2012/0133599 | A1* | 5/2012 | Cho | G06F 3/0412 345/173 |
| 2012/0309456 | A1* | 12/2012 | Yamamoto | H04L 25/0278 455/557 |
| 2013/0169517 | A1* | 7/2013 | Cho | G09G 3/3696 345/82 |
| 2013/0328839 | A1* | 12/2013 | Jamal | G09G 3/3648 345/204 |
| 2014/0084792 | A1* | 3/2014 | Oh | H05B 37/02 315/120 |

FOREIGN PATENT DOCUMENTS

| | | | | | |
|---|---|---|---|---|---|
| KR | 1020030091374 | A | | 12/2003 | |
| KR | 1020110132723 | A | | 12/2011 | |
| KR | 1020120017714 | A | | 2/2012 | |
| KR | 2013030126 | A | * | 3/2013 | G05F 1/56 |

* cited by examiner

ORGANIC LIGHT EMITTING DISPLAY DEVICE

RELATED APPLICATIONS

This application claims priority to and the benefit of Korean Patent Application No. 10-2013-0065340, filed on Jun. 7, 2013, in the Korean Intellectual Property Office, the entire contents of which are incorporated herein by reference in their entirety.

BACKGROUND

1. Field

An aspect of the present invention relates to an organic light emitting display.

2. Description of the Related Art

Organic light emitting displays display images using organic light emitting diodes that generate light through recombination of electrons and holes. Organic light emitting displays have both a fast response speed and are driven with low power consumption. Hence, the organic light emitting display has come into the spotlight as a next-generation display.

Organic light emitting displays include a display panel having a plurality of pixels to display an image, a source circuit board coupled to a side portion of the display panel and having a driver IC mounted thereon, and a power circuit board on which a power supply unit is mounted. The power supply unit supplies a driving power source of the display panel from the exterior of the display panel.

The voltage level of the supplied driving power source may be changed depending on display characteristics of the display panel. Before a product is released for sale, an operator inspects whether gray scales are appropriately expressed in a factory mode, so that the voltage level of the driving power source is determined and then stored as an optimized value. Subsequently, whenever the product is driven, the driving power source with the stored voltage level is applied to the display panel.

SUMMARY

According to an aspect, an organic light emitting display is provided, including: a display panel including a plurality of pixels; a power supply circuit configured to output a first power source to the display panel; a voltage detection unit positioned between the display panel and the power supply circuit, the voltage detection unit detecting detection voltage data of the first power source output from the power supply circuit; and a voltage compensation unit configured to compare the detection voltage data with a previously stored reference voltage data, and control the power supply circuit to output the first power source having a voltage level set based on the reference voltage data.

The organic light emitting display may further include a first board positioned at the outside of the display panel and including the power supply circuit. The organic light emitting display may further include a second board disposed adjacent to a side portion of the display panel and including at the voltage detection unit and the voltage power circuit.

The first board may be a power circuit board, and the second board may be a source circuit board.

The display panel and the second board may be electrically coupled to each other through a coupling member.

The coupling member may include any one of a chip on film (COF), a tape carrier package (TCP) and a flexible printed circuit board (FPCB).

The organic light emitting display may further include a first power line configured to provide a conduction path for the first power source by electrically coupling the power supply circuit to the display panel; and a feedback line configured to provide a conduction path for a feedback voltage output from the voltage compensation circuit by electrically coupling the voltage compensation circuit to the power supply circuit.

The first power line may be coupled in parallel to a filtering capacitor and first and second voltage dividing resistors.

The feedback line may be coupled in parallel to third and fourth voltage dividing resistors.

The power supply circuit may control the first power source using the feedback voltage provided from the feedback line.

The power supply circuit may include a power management IC (PMIC).

The voltage detection unit may include an analog-digital converter (ADC) configured to convert the first power source into a digital signal.

The voltage compensation circuit may include an electrically erasable programmable read-only memory (EEPROM) configured to store the reference voltage data therein; a micro controller unit (MCU) configured to compare the detection voltage data with the reference voltage data and calculate a compensation value set based on a result of comparing the detection voltage data with the reference voltage data; and a digital-analog converter (DAC) configured to convert the compensation value into an analog signal.

The reference voltage data may be set by an operator in a factory mode.

The first power source may have different voltage levels respectively corresponding to emission and non-emission periods of an emission signal supplied to the display panel. The different voltage levels may be alternately applied during the emission and non-emission periods.

In the non-emission period, the voltage compensation circuit may compare the detection voltage data with a previously stored first reference voltage data, and control the power supply circuit to output the first power source having a first voltage level according to the first reference voltage data. In the emission period, the voltage compensation circuit may compare the detection voltage data with a previously stored second reference voltage data, and control the power supply circuit to output the first power source having a second voltage level according to the second reference voltage data.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being “between” two elements, it can be the only element between the two elements, or one or more intervening elements may also be present. Like reference numerals refer to like elements throughout.

DETAILED DESCRIPTION

Figure 1:
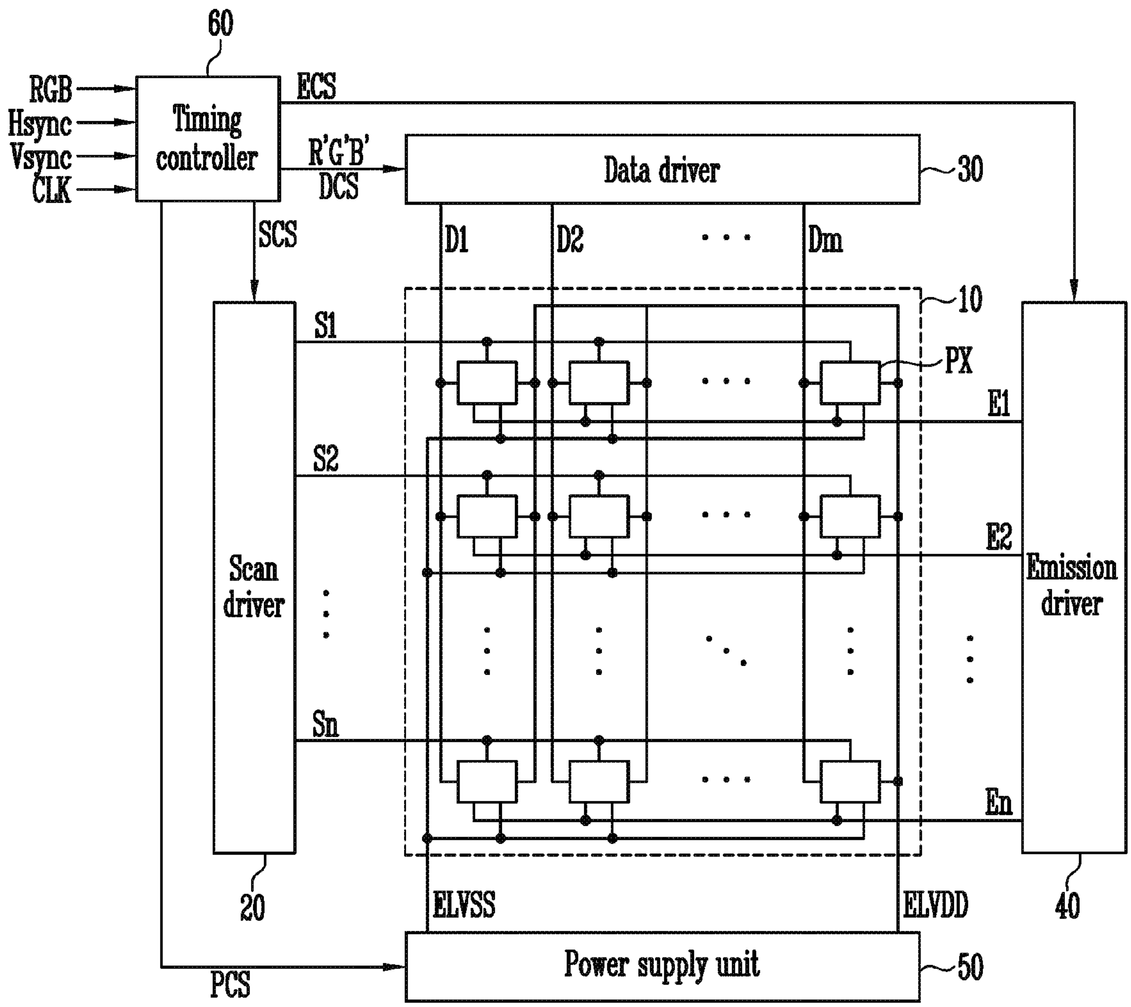
FIG. 1 is a schematic block diagram illustrating an organic light emitting display according to an example embodiment.

Hereinafter, certain example embodiments will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the disclosure are omitted for clarity. Also, like reference numerals refer to like elements throughout.

FIG. 1 is a schematic block diagram illustrating an organic light emitting display according to an example embodiment.

Referring to FIG. 1, the organic light emitting display according to this example embodiment includes a pixel unit 10, a scan driver 20, a data driver 30, an emission driver 40, a power supply unit 50 and a timing controller 60.

N scan lines S1 to Sn, n emission control signal lines E1 to En, m data lines D1 to Dm and a plurality of pixels PX are formed in the pixel unit 10. Here, the n scan lines S1 to Sn (n is a natural number greater than 0) are formed in a first direction to supply scan signals, and the n emission control signal lines E1 to En are formed in the first direction to supply emission signals. The m data lines D1 to Dm (m is a natural number greater than 0) are formed in a second direction intersecting the first direction to supply data signals. The plurality of pixels PX are formed at intersection portions of the scan lines, the emission control signal lines and the data lines. Each pixel PX includes an organic light emitting diode and at least two transistors.

The scan driver 20 generates a scan signal, based on a scan control signal SCS from the timing controller 60, and supplies the generated scan signal to the scan lines S1 to Sn.

Specifically, the scan driver 20 progressively generates a scan signal, in response to the scan control signal SCS, while shifting the level of the scan signal with the swing width of a gate driving voltage at which the transistors of the pixels PX included in the pixel unit 10 can be operated.

The scan driver 20 is coupled to the plurality of scan lines S1 to Sn, and supplies the generated scan signal to each of the scan lines S1 to Sn. A predetermined row on which pixels are positioned among the plurality of pixels PX of the pixel unit 10 is selected by the scan signal, and a data signal is supplied through the data lines D1 to Dm respectively coupled to the pixels positioned on the selected row.

The scan driver 20 may supply the scan signal according to a predetermined scan frequency. The scan frequency may be controlled by the timing controller 60.

The data driver 30 generates a data signal, based on image data R'G'B' and a data control signal DCS from the timing controller 60, and supplies the generated data signal to the data lines D1 to Dm.

Specifically, in response to the data control signal DCS, the data driver 30 samples digital image data R'G'B' supplied from the timing controller 60 and latches the sampled digital image data R'G'B' to be converted into data of a parallel data system.

In this case, the data driver 30 converts the digital image data R'G'B' into a gamma reference voltage to be converted into an analog image signal. The data driver 30 supplies the converted image signal to the pixels PX included in the pixel unit 10 through the data lines D1 to Dm.

The data driver 30 is coupled to the plurality of data lines D1 to Dm, and progressively supplies the generated data signal to a plurality of pixels positioned on one row among the pixels PX of the pixel unit 10 through the respective data lines D1 to Dm.

If the scan signal is progressively supplied to the scan lines S1 to Sn as described above, pixels PX are progressively selected for each line. Thus, the selected pixels PX can receive the data signal supplied from the data lines D1 to Dm.

The emission driver 40 is coupled to the plurality of emission control signal lines E1 to En, and generates an emission signal to be supplied to each of the emission control signal line E1 to En. The emission driver 40 may adjust the pulse width of the emission signal, based on an emission control signal ECS from the timing controller 60.

That is, the pixel unit 10 coupled to the emission control signal lines E1 to En receives the emission signal supplied from the emission driver 40 so as to determine a time when the current generated in each pixel PX flows through the organic light emitting diode.

The emission driver 40 controls the pulse voltage levels of emission signals respectively supplied to a plurality of pixel included in a plurality of pixel lines either to be all equal or to be progressively changed for each row. Thus, the emission driver 40 can control the emission method of the pixel unit 10 to be implemented either in a simultaneous emission mode or progressive emission mode, when necessary.

The power supply unit 50 supplies a high-potential first power source ELVDD and a low-potential second power source ELVSS to the pixel unit 10. Each pixel PX receiving the first and second power sources ELVDD and ELVSS supplied from the power supply unit 50 emits light based on the data signal via the organic light emitting diode with current flowing from the first power source ELVDD to the second power source ELVSS.

The power supply unit 50 may supply the first or second power source ELVDD or ELVSS with a predetermined voltage level to the pixel unit 10, based on a power control signal PCS from the timing controller 60. The power supply unit 50 may supply a separate power source to each of the pixel units 10, the scan driver 20, the data driver 30 and the emission driver 40.

The timing controller 60 receives image data RGB of red, green and blue, input from the exterior of the organic light emitting display, and inputs control signals for controlling the image data RGB to be displayed, e.g., a horizontal synchronization signal Hsync, a vertical synchronization signal Vsync, a clock signal CLK, etc.

The timing controller 60 generates driving control signals SCS, DCS and ECS for controlling the driving of the scan driver 20, the data driver 30 and the emission driver 40, based on the input control signals. That is, the scan control signal SCS generated in the timing controller 60 is supplied to the scan driver 20, and the data control signal DCS generated in the timing controller 60 is supplied to the data driver 30. The timing controller 60 supplies the emission control signal ECS to control the output waveform of the emission signal generated in the emission driver 40.

The scan control signal SCS may include a gate start pulse GSP, a gate shift clock GSC, a gate output enable signal GOE, etc. The gate start pulse GSP is supplied to a gate drive integrated circuit (IC) in which a first scan signal is generated. The gate shift clock GSC is a clock signal commonly input to the gate drive ICs so as to shift the gate start pulse GSP. The gate output enable signal GOE controls outputs of the gate drive ICs.

The data control signal DCS may include a source start pulse SSP, a source sampling clock SSC, a source output enable signal SOE, etc. The source start pulse SSP controls a time when data sampling of the data driver 30 is started. The source sampling clock SSC is a clock signal for controlling a data sampling operation in the data driver 30, based on a rising or falling edge. The source output enable signal SOE controls an output of the data driver 30. The source start pulse SSP supplied to the data driver 30 may be omitted depending upon the data transmission method of the data driver 30.

Figure 2:
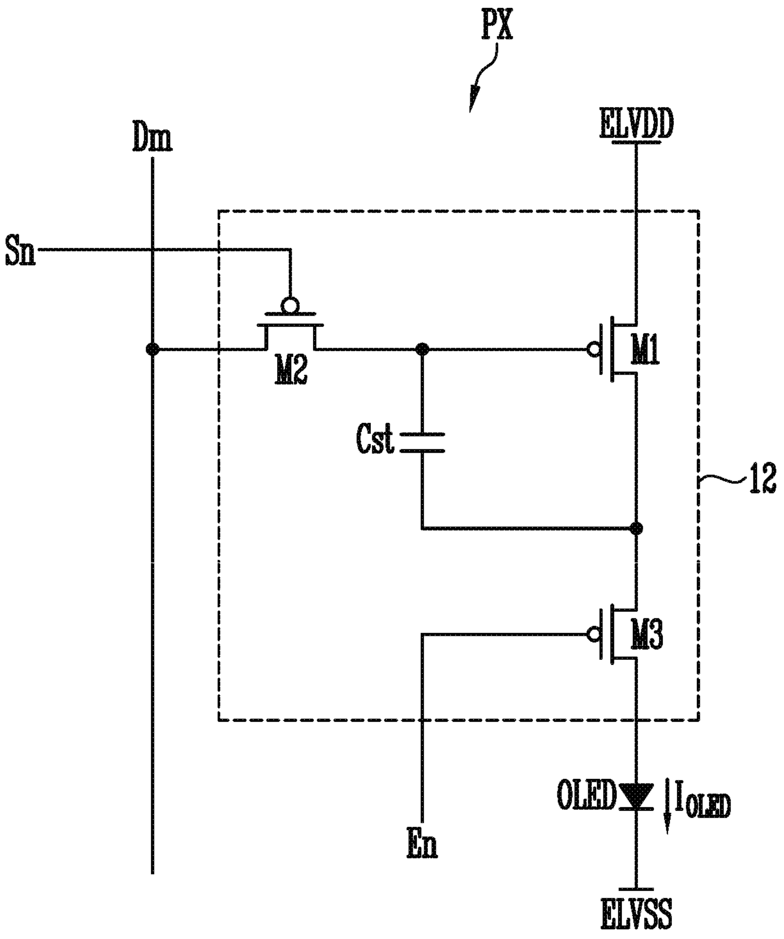
FIG. 2 is a circuit diagram illustrating an embodiment of a pixel shown in FIG. 1.

FIG. 2 is a circuit diagram illustrating an example embodiment of the pixel shown in FIG. 1.

However, the pixel provided in the organic light emitting display is not limited to the example embodiment of FIG. 2.

Referring to FIG. 2, the pixel PX according to this example embodiment includes an organic light emitting diode OLED as a light emitting device, and a pixel circuit 12.

An anode electrode of the organic light emitting diode OLED is coupled to the pixel circuit 12, and a cathode electrode of the light emitting diode OLED is coupled to the second power source ELVSS. The organic light emitting diode OLED generates light with a predetermined luminance corresponding to driving current $I_{OLED}$ supplied from the pixel circuit 12.

The pixel circuit 12 controls current flowing from the first power source ELVDD to the second ELVSS via the organic light emitting diode OLED, the amount of current corresponding to a data signal supplied to data line Dm when a scan signal is supplied to a scan line Sn.

To this end, the pixel circuit 12 includes first to third transistors M1 to M3 and a storage capacitor Cst.

The first transistor M1 is a driving transistor that generates current corresponding to the voltage applied between a gate electrode and a second electrode thereof, and supplies the generated current to the organic light emitting diode OLED.

To this end, a first electrode of the first transistor M1 is coupled to the first power source ELVDD, and the second electrode of the first transistor M1 is coupled to a first electrode of the third transistor M3. The gate electrode of the first transistor M1 is coupled to a first electrode of the second transistor M2.

The first electrode of the second transistor M2 is coupled to the gate electrode of the first transistor M1, and a second electrode of the second transistor M2 is coupled to the data line Dm. A gate electrode of the second transistor M2 is coupled to the scan line Sn.

When the scan signal is supplied from the scan line Sn, the second transistor M2 is turned on to supply the data signal supplied from the data line Dm to the gate electrode of the first transistor M1. When the scan signal is not supplied, the second transistor M2 is turned off to block the supply of the data signal.

One terminal of the storage capacitor Cst is coupled to the gate electrode of the first transistor M1, and the other terminal of the storage capacitor Cst is coupled to the second electrode of the first transistor M1, so as to charge the storage capacitor Cst with a voltage corresponding to the input data signal.

The first electrode of the third transistor M3 is coupled to the second electrode of the first transistor M1, and a second electrode of the third transistor M3 is coupled to the anode electrode of the organic light emitting diode OLED. A gate electrode of the third transistor M3 is coupled to an emission signal line En.

When an emission signal is supplied from the emission signal line En, the third transistor M3 is turned on to allow the anode electrode of the organic light emitting diode OLED and the second electrode of the first transistor M1 to be electrically coupled to each other. Accordingly, the third transistor M3 enables the current generated in the first transistor M1 to flow through the organic light emitting diode OLED according to the voltage charged in the storage capacitor Cst.

The anode electrode of the organic light emitting diode OLED is coupled to the second electrode of the third transistor M3, and the cathode electrode of the organic light emitting diode OLED is coupled to the second power source ELVSS. Thus, the organic light emitting diode OLED emits light with a luminance corresponding to the voltage of the data signal by receiving the driving current $I_{OLED}$ input from the pixel circuit 12.

Figure 3:
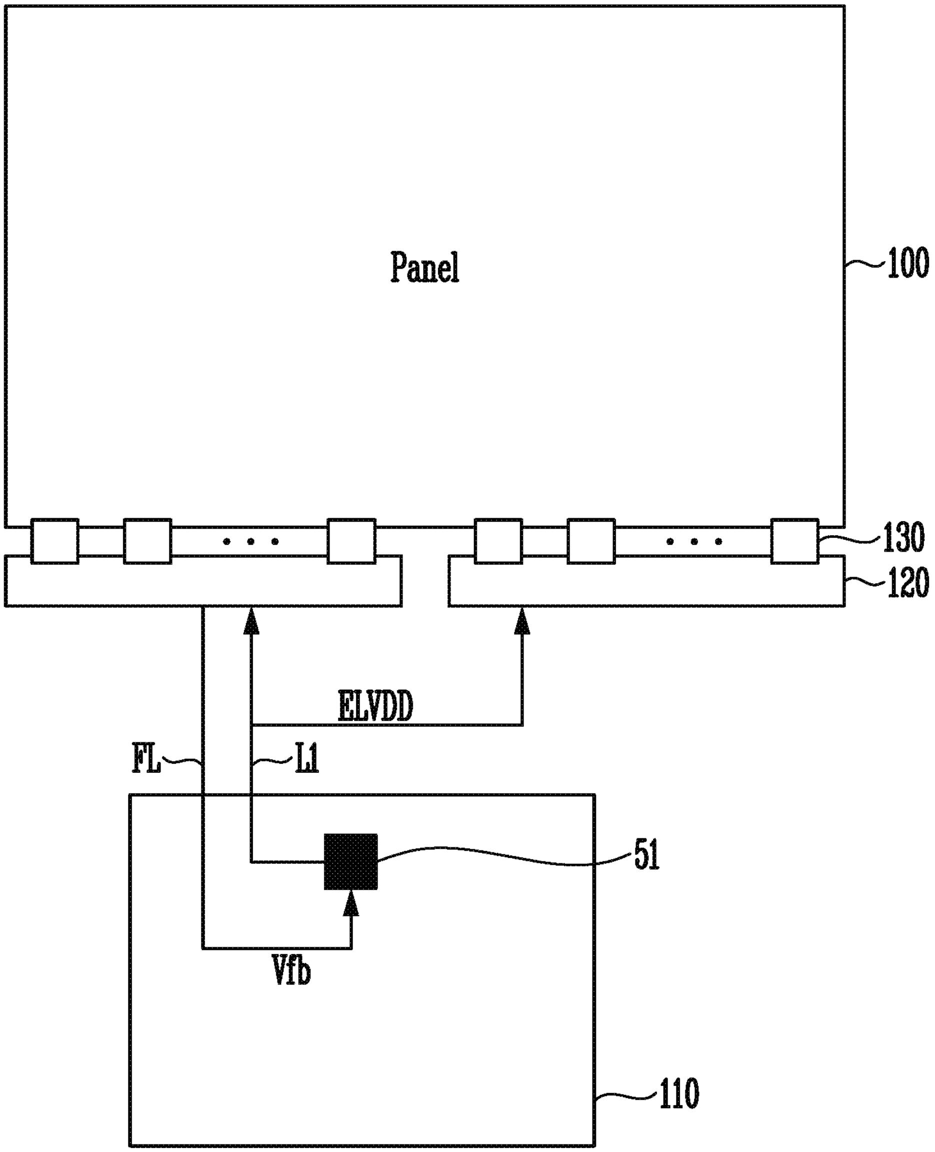
FIG. 3 is a plan view illustrating an organic light emitting display including first and second boards according to an example embodiment.

FIG. 3 is a plan view illustrating an organic light emitting display including first and second boards according to an example embodiment.

Referring to FIG. 3, the organic light emitting display according to this embodiment may include a display panel 100, a first board 110, a second board 120 and a coupling member 130.

The display panel 100 may include the plurality of pixels PX described above, thereby displaying a predetermined image. The display panel 100 of this example embodiment is an organic light emitting display panel in which driving power (first and second power sources) is directly applied to the pixels PX.

The first board 110 is positioned outside of the display panel 100, and may be, for example, a power circuit board (EL power board) including a power supply circuit 51. The power supply circuit 51 is a portion of the power supply unit 50 described above, and may be configured in the form of a power management IC (PMIC).

The second board 120 may be a source circuit board disposed adjacent to a side portion of the display panel 100. The display panel 100 and the second board 120 may be electrically coupled to each other through the coupling member 130. The coupling member 130 may include, for example, any one of a chip on film (COF), a tape carrier package (TCP) and a flexible printed circuit board (FPCB). For example, the display panel 100 and the second substrate 120 may be coupled to each other through a plurality of TCPs. A source IC including the scan driver 20 described above or a gate IC including the data driver 30 described above may be mounted on each TCP.

The first and second boards 110 and 120 may be electrically coupled to each other through a first power line L1 and a feedback line FL. The first power line L1 and the feedback line FL may be configured with a flexible cable, e.g., a flexible flat cable (FFC).

The first power line L1 provides a conduction path of the first power source ELVDD by electrically coupling the power supply circuit 51 mounted on the first board 110 to the display panel 100.

Specifically, the first power line L1 is coupled to power pads (not shown) positioned at one side of the display panel 100 via the second board 120, so as to supply the first power source ELVDD to each pixel PX.

The feedback line FL provides a conduction path of a feedback voltage Vfb output from a voltage compensation circuit 55 mounted on the second board 120 (FIG. 4) by electrically coupling the voltage compensation circuit 55 to the power supply circuit 51 mounted on the first board 110.

As a result, the display panel 100 and the power supply circuit 51 mounted on the first board 110 are electrically coupled to each other, so that the first power source ELVDD generated in the power supply circuit 51 can be supplied to the display panel 100.

Figure 4:
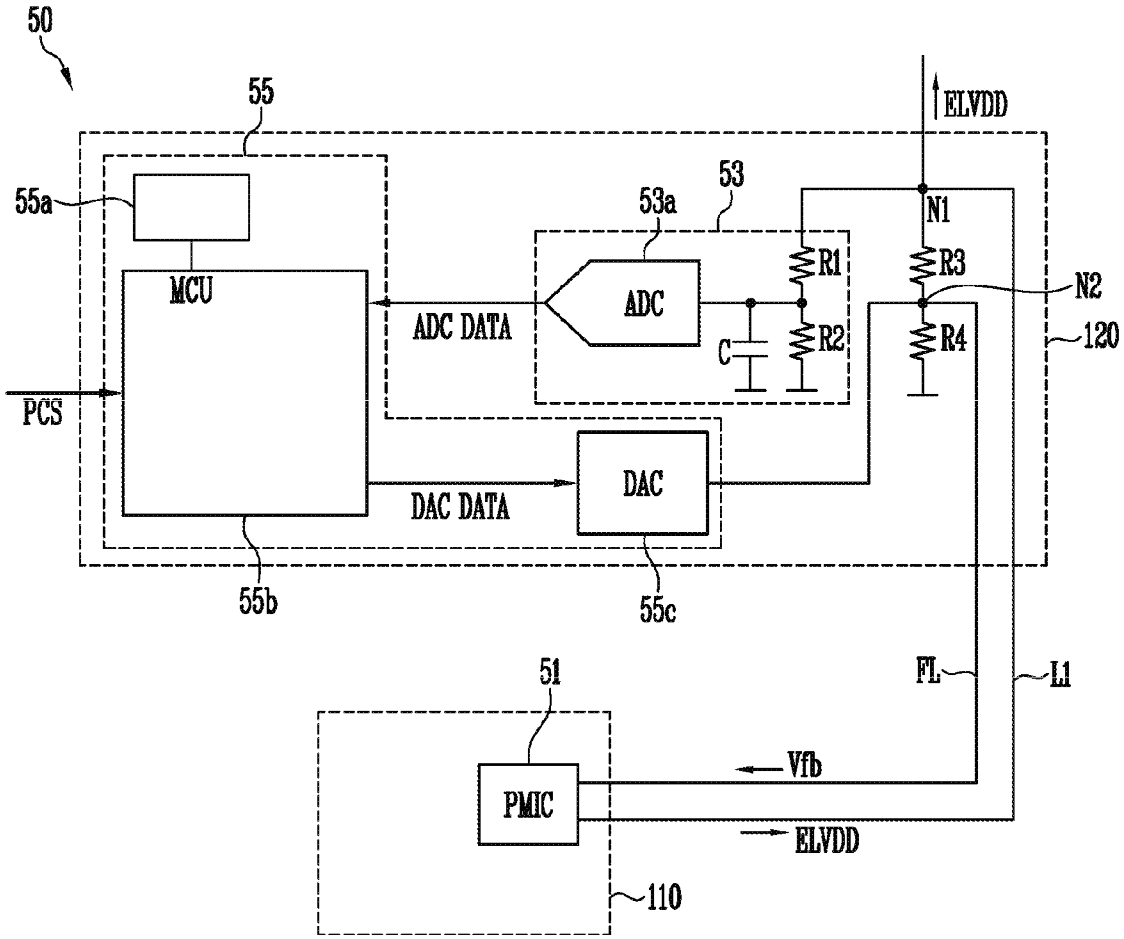
FIG. 4 is a diagram illustrating the detailed configuration of a power supply unit according to an example embodiment.
Figure 5:
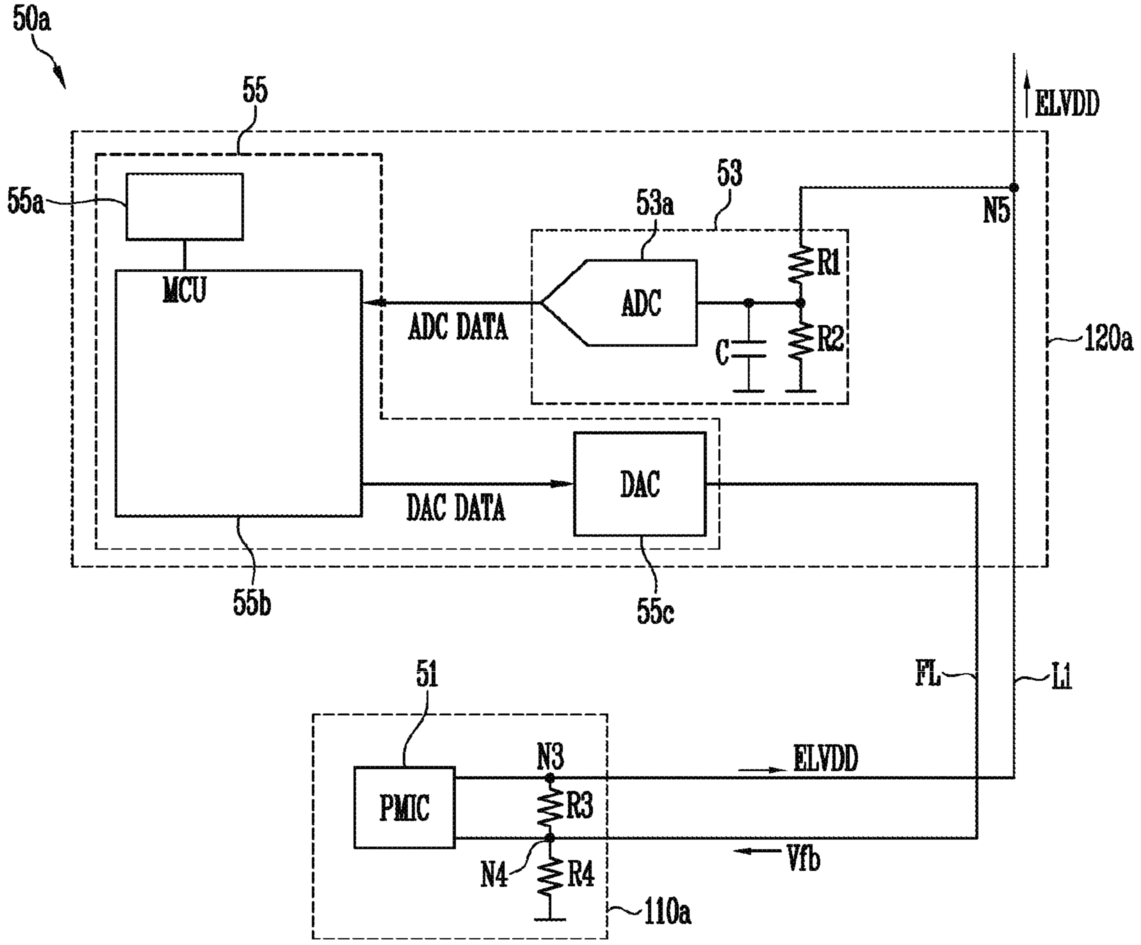
FIG. 5 is a diagram illustrating the detailed configuration of a power supply unit according to another example embodiment.

FIG. 4 is a diagram illustrating the detailed configuration of a power supply unit according to an example embodiment. FIG. 5 is a diagram illustrating the detailed configuration of a power supply unit according to another example embodiment.

Referring to FIG. 4, the power supply unit 50 of the organic light emitting display according to this embodiment includes a power supply circuit 51, a voltage detection unit 53 and a voltage compensation circuit 55.

The circuits constituting the power supply unit 50 may be distributed and arranged on the first and second boards 120. In this embodiment, the power supply circuit 51 is mounted on the first board 110, and the voltage detection unit 53 and the voltage compensation circuit 55 are mounted on the second board 120.

The power supply circuit 51 outputs the first power source ELVDD to the display panel 100 through the first power line L1. The power supply circuit 51 may control the first power source ELVDD, so that the first power source ELVDD may be adjusted based on the feedback voltage Vfb provided from the feedback line FL, as described below.

For example, a PMIC or switching regulator for DC-DC conversion may be used as the power supply circuit 51. Although not shown in this figure, the power supply circuit 51 may include a switching unit (not shown). The power supply circuit 51 adjusts the switching frequency or duty rate of the switching unit based on the feedback voltage Vfb, thereby generating a desired voltage of the first power source ELVDD.

However, the power supply circuit 51 is not limited to this circuit structure, and may be modified into various circuit structures capable of generating the first power source ELVDD.

The voltage detection unit 53 is positioned between the display panel 100 and the power supply circuit 51, and detects the voltage of the first power source ELVDD supplied from the power supply circuit 51.

The voltage detection unit 53 is electrically coupled to the power supply circuit 51 through the first power line L1. The first power line L1 is branched at a first node N1 into a line directed toward the display panel 100 and a line directed toward the voltage detection unit 53.

A filtering capacitor C and first and second voltage dividing resistors R1 and R2 in voltage detection unit 53 may be coupled to the line directed toward the voltage detection unit 53 from the branched first power line L1. The first and second voltage dividing resistors R1 and R2 are resistors that measure the first power source ELVDD by dividing a voltage received by the voltage detection unit 53. The filtering capacitor C may be coupled in parallel to remove noise of an AC component.

The voltage detection unit 53 may include an analog-digital converter (ADC) 53*a* that converts the first power source ELVDD into a digital signal. The first power source ELVDD is converted and output into an ADC data value by the ADC 53*a*.

The voltage compensation circuit 55 compares the detected voltage data (the ADC data value of the first power source ELVDD, detected through the voltage detection unit 53, with a previously stored reference voltage data. The voltage compensation circuit uses the reference data and the detected voltage data to control the output the first power source ELVDD so that the output of the first power source ELVDD has a voltage level that is set according to the reference voltage data.

Specifically, the voltage compensation circuit 55 may include an electrically erasable programmable read-only memory (EEPROM) 55*a*, a micro controller unit (MCU) 55*b* and a digital-analog converter (DAC) 55*c*. The EEPROM 55*a* is a nonvolatile memory in which the reference voltage data is stored. The MCU 55*b* compares the detected voltage data with the reference voltage data and calculates a compensation value, based on the compared result. The DAC 55*c* converts the compensation value into an analog signal and outputs the converted analog signal.

The reference voltage data may include a reference voltage value and a reference DAC value. The reference voltage value and the reference DAC value may be set by an operator in a factory mode. The compensation value may include a compensation voltage value or compensation DAC value.

For example, the compensation DAC value is converted and output into a feedback voltage Vfb by the DAC 55*c*, so that the converted feedback voltage Vfb is applied to the power supply circuit 51 through the feedback line FL.

The feedback line FL may be coupled in parallel to third and fourth voltage dividing resistors R3 and R4 provided on the second board 120. Specifically, the third voltage dividing resistor R3 is coupled between the first node N1 of the first power line L1 and a second node N2 of the feedback line FL. The fourth voltage dividing resistor R4 is coupled between the second node N2 and a ground terminal.

Referring to FIG. 5 as another example embodiment, the third and fourth voltage dividing resistors R3 and R4 may be provided on the first board 110. Specifically, the third voltage dividing resistor R3 is coupled between a third node N3 of the first power line L1 and a fourth node N4 of the feedback line FL. The fourth voltage dividing resistor R4 is coupled between the fourth node N4 and the ground terminal.

The voltage detection unit 53 and the voltage compensation circuit 55 are not limited to the circuit structures, and may be modified into various circuit structures capable of detecting the level of the first power source ELVDD and compensating level of the first power source ELVDD so as to have an initially stored voltage level (i.e., the reference voltage).

Figure 6:
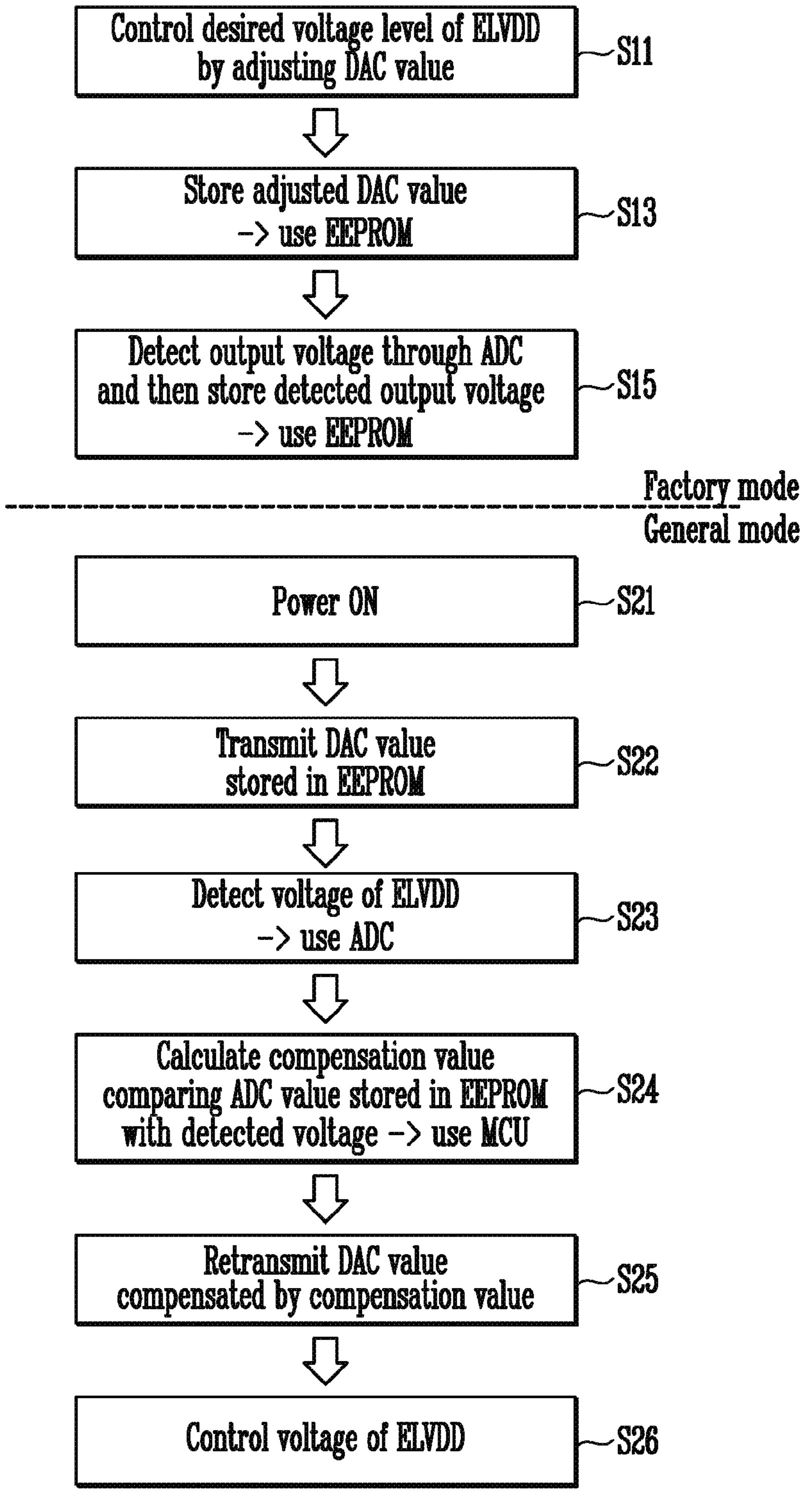
FIGS. 6 and 7 are a flowchart and a waveform diagram, illustrating a voltage compensation method of the power supply unit shown in FIG. 4 according to an example embodiment.
Figure 7:
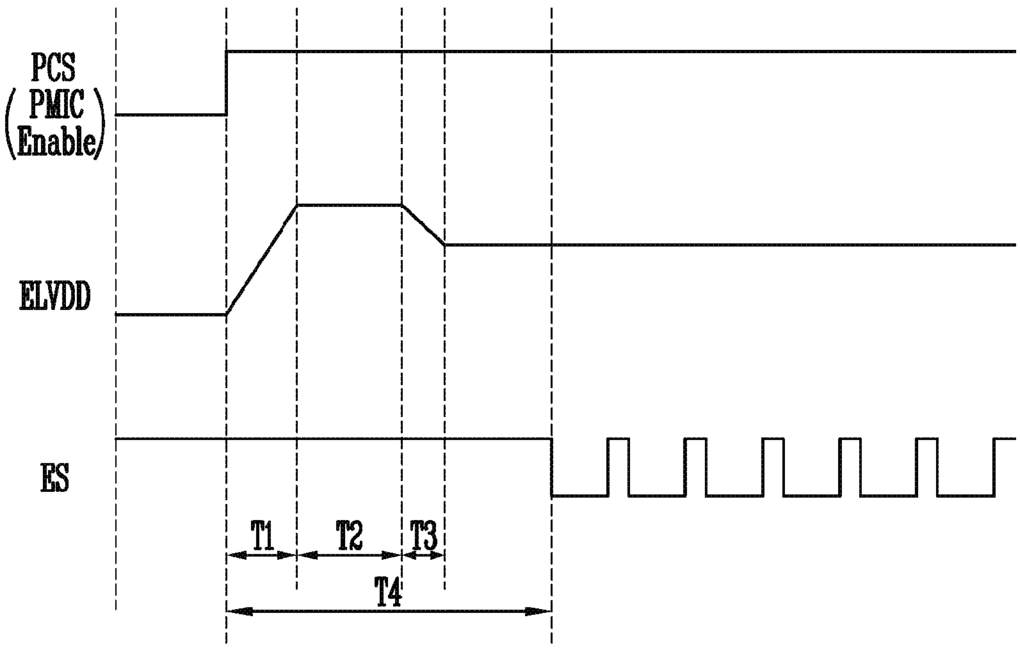

FIGS. 6 and 7 are a flowchart and a waveform diagram, illustrating a voltage compensation method of the power supply unit shown in FIG. 4 according to an example embodiment.

The voltage compensation method according to this embodiment will be described as an example with reference to FIGS. 6 and 7.

First, before being released as a completed product, the organic light emitting display undergoes a pre-setting process that is one of the tuning processes performed by an operator.

That is, the operator controls the voltage level of the first power source ELVDD so that the expression of a gray scale is optimized by adjusting a DAC value through a separate interface that sets the power supply unit 50 (S11).

Next, the adjusted DAC value is set as a reference DAC value and then stored in the voltage compensation circuit 55 memory, EEPROM 55*a* (S12). The voltage value of the first power source ELVDD is detected through the ADC 53*a*. The detected voltage value is set as a reference voltage value and then stored in the EEPROM 55*a* (S13).

In a general mode after the product is released, the following process is performed whenever the power of the organic light emitting display is on.

When the power of the organic light emitting display is on, the timing controller 60 generates a power control signal PCS and outputs the generated power control signal PCS (FIG. 1 and FIG. 4) to the power supply unit 50 (S21).

During a first period T1, the power control signal PCS is input, and simultaneously, the MCU 55*b* transmits the DAC value stored in the EEPROM 55*a*. The power supply circuit 51 starts outputting the first power source ELVDD (S22).

Next, during a second period T2, the voltage of the first power source ELVDD is detected by the ADC 53*a* of the voltage detection unit 53 (S23).

The MCU 55*b* of the voltage compensation circuit 55 calculates a compensation value by comparing the reference voltage data stored in the EEPROM 55*a* with the detected voltage data (S24), and transmits a DAC value compensated by the compensation value (S25).

Next, during a third period (T3), the power supply circuit 51 adjusts the switching frequency or duty rate of the switching unit, by an amount corresponding to the feedback voltage Vfb, thereby controlling the voltage level of the first power source ELVDD.

In this case, the voltage compensation process of steps S21 to S26 may be completed during a fourth period T4 in which an emission signal ES is maintained in a non-emission state (it is assumed in this embodiment that a high level means non-emission), based on the time when the power control signal PCS is output.

Figure 8:
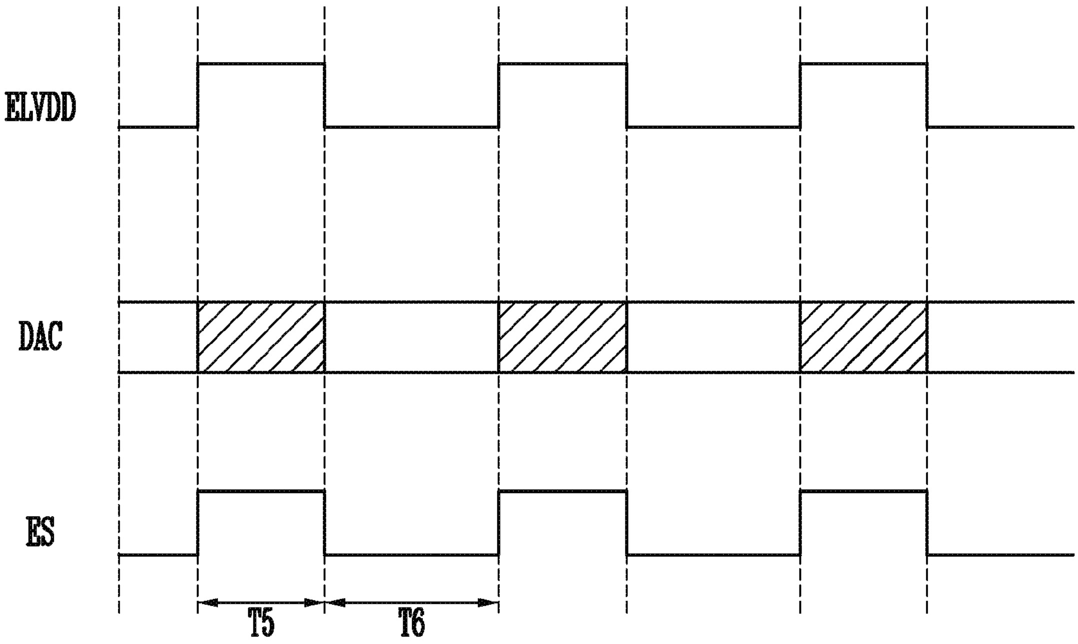
FIG. 8 is a waveform diagram illustrating a voltage compensation method according to another example embodiment.

FIG. 8 is a waveform diagram illustrating a voltage compensation method according to another example embodiment.

The voltage compensation method according to this embodiment will be described as an example with reference to FIG. 8.

In this embodiment, the first power ELVDD has voltage values of different levels.

Specifically, the first power source ELVDD has a first voltage level (high level) corresponding to a non-emission period T5 of the emission signal ES applied to the display panel 100, and a second voltage level (low level) corresponding to an emission period T6 of the emission signal ES. Here, the first and second voltage levels are alternately applied during the periods T5 and T6.

Accordingly, the voltage compensation method according to this embodiment performs setting and compensation on each of the different voltage levels of the first power source ELVDD in the voltage compensation method of the aforementioned embodiment.

That is, in the pre-setting process of the factory mode, the first voltage level of the first power source ELVDD, corresponding to the non-emission period T5, is adjusted and stored as a first reference voltage data, and the second voltage level of the first power source ELVDD, corresponding to the emission period T6, is adjusted and stored as a second reference voltage data.

Next, in the compensation process of the general mode, the voltage compensation circuit 55 compares the detected voltage data with the first reference voltage data in the non-emission period T5, and controls the power supply circuit 51 to output the first power source ELVDD having the first voltage level according to the first reference voltage data. The voltage compensation circuit 55 compares the detected voltage data with the second reference voltage data in the emission period T6, and controls the power supply circuit 51 to output the first power source ELVDD having the second voltage level according to the second reference voltage data.

By way of summation and review, an organic light emitting display stores a power data in an EEPROM mounted on a source circuit board. However, in a case where a power circuit board having the power supply unit mounted thereon is changed or replaced, for instance in an assembling process of the organic light emitting display, the driving power output from the power supply unit may not maintain an initially set value as a result of the variation in components on power circuit boards.

According to the organic light emitting display of the present disclosure, the driving power output from the power supply unit is detected in the display panel and then compared with a previously stored reference voltage data, thereby providing driving power compensated to have a voltage level according to the reference voltage data. Accordingly, it is possible to stably supply the driving power of an initially set reference voltage.

As a result, it is possible to compensate for a voltage difference of the driving power, which is caused by a variation in components, generated when the power circuit board is changed or replaced, and to output a predetermined optimum setting value whenever the power of the organic light emitting display is on. Accordingly, the degradation of display quality does not occur, and the expression of a gray scale between manufactured display panels can be equalized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure, including the following claims.

What is claimed is:

1. An organic light emitting display device, comprising:

a display panel including a plurality of pixels;

a power supply circuit configured to output a first power source to the display panel, the power supply circuit being disposed on a first board;

a voltage detection unit disposed between the display panel and the power supply circuit, the voltage detection unit detecting a detection voltage data of the first power source output from the power supply circuit;

a voltage compensation circuit configured to compare the detection voltage data with a previously stored reference voltage data, and control the power supply circuit to output the first power source having a voltage level set based on the reference voltage data; and a second board disposed between the display panel and the first board, the second board including the voltage detection unit and the voltage compensation circuit, wherein the voltage compensation circuit includes an electrically erasable programmable read-only memory (EEPROM) configured to store the reference voltage data therein, a micro controller unit (MCU) configured to compare the detection voltage data with the reference voltage data and calculate a compensation value set based on a result of comparing the detection voltage data with the reference voltage data, and a digital-analog converter (DAC) configured to convert the compensation value into an analog signal.

2. The organic light emitting display device of claim 1, wherein the first board is a power circuit board, and the second board is a source circuit board.

3. The organic light emitting display device of claim 1, wherein the display panel and the second board are electrically coupled to each other through a coupling member.

4. The organic light emitting display device of claim 3, wherein the coupling member includes any one of a chip on film (COF), a tape carrier package (TCP) and a flexible printed circuit board (FPCB).

5. The organic light emitting display device of claim 1, further comprising:

a first power line configured to provide a conduction path for the first power source by electrically coupling the power supply circuit to the display panel; and a feedback line configured to provide a conduction path for a feedback voltage output from the voltage compensation circuit by electrically coupling the voltage compensation circuit to the power supply circuit.

6. The organic light emitting display device of claim 5, wherein the first power line is coupled in parallel to a filtering capacitor and first and second voltage dividing resistors.

7. The organic light emitting display device of claim 5, wherein the feedback line is coupled in parallel to third and fourth voltage dividing resistors.

8. The organic light emitting display device of claim 5, wherein the power supply circuit controls the first power source using the feedback voltage provided from the feedback line.

9. The organic light emitting display device of claim 1, wherein the power supply circuit is a power management IC (PMIC).

10. The organic light emitting display device of claim 1, wherein the voltage detection unit includes an analog-digital converter (ADC) configured to convert the first power source into a digital signal.

11. The organic light emitting display device of claim 1, wherein the reference voltage data is set by an operator in a factory mode.

12. The organic light emitting display device of claim 1, wherein the first power source has different voltage levels respectively corresponding to emission and non-emission periods of an emission signal supplied to the display panel, and wherein the different voltage levels are alternately applied during the emission and non-emission periods.

13. The organic light emitting display device of claim 12, wherein, in the non-emission period, the voltage compensation circuit compares the detection voltage data with a previously stored first reference voltage data, and controls the power supply circuit to output the first power source having a first voltage level according to the first reference voltage data, and wherein, in the emission period, the voltage compensation circuit compares the detection voltage data with a previously stored second reference voltage data, and controls the power supply circuit to output the first power source having a second voltage level according to the second reference voltage data.

* * * * *